United States Patent [19]
Gabelica et al.

[11] Patent Number: 5,354,719
[45] Date of Patent: Oct. 11, 1994

[54] METHOD OF MANUFACTURING METALLOSILICATES

[75] Inventors: Zelimir Gabelica, Waremme-Oleve, Belgium; Reinaldo Monque, Chuao; Giuseppe Giannetto, Colinas de Bello Monte, both of Venezuela

[73] Assignee: Intevep, S.A., Caracas, Venezuela

[21] Appl. No.: 55,089

[22] Filed: May 3, 1993

[51] Int. Cl.$^5$ ............... B01J 29/06; B01J 37/00; C01B 33/34
[52] U.S. Cl. ......................... 502/62; 502/60; 502/77; 423/704; 423/714; 423/DIG. 22
[58] Field of Search .............. 423/DIG. 22, DIG. 29, 423/704, 714, 715; 502/77, 60, 62

[56] References Cited

U.S. PATENT DOCUMENTS

| | | | |
|---|---|---|---|
| 4,485,185 | 11/1984 | Onodera et al. | 502/77 |
| 4,495,166 | 1/1985 | Calvert et al. | 423/DIG. 29 |
| 4,528,171 | 7/1985 | Casci et al. | 502/77 |
| 4,851,605 | 7/1989 | Bortinger et al. | 423/DIG. 22 |
| 5,182,090 | 1/1993 | Dwyer et al. | 423/702 |
| 5,246,688 | 9/1993 | Faust et al. | 423/704 |

*Primary Examiner*—Carl F. Dees
*Attorney, Agent, or Firm*—Bachman & LaPointe

[57] ABSTRACT

A process for preparing a metallosilicate catalyst includes the steps of: forming a mixture of at least one non-alkali metal, a templating agent, and an organic base; adding a silicon additive to the mixture so as to form a metallosilicate hydrogel; aging the hydrogel to obtain a crystalline metallosilicate composition; washing and drying the crystalline composition; and calcining the crystalline composition so as to provide a metallosilicate catalyst. Two or more non-alkali metals may be selected so as to provide a multifunctional catalyst.

30 Claims, 3 Drawing Sheets

METHOD OF MANUFACTURING METALLOSILICATES

CROSS REFERENCE TO RELATED DOCUMENTS

This application is related to Disclosure Document No. 315,454 filed Jun. 15, 1992.

BACKGROUND OF THE INVENTION

The present invention relates to the field of catalysts and, more particularly, to a single step process for preparing an alkali-free acidic metallosilicate catalyst and to a process for preparing an alkali-free acidic multifunctional metallosilicate catalyst for use in various hydrocarbon reactions.

Protonic or acidic metallosilicate catalysts are frequently used for numerous hydrocarbon reactions, and are employed for example during the refining of hydrocarbons. Such reactions include, for example, alkylation, dealkylation, dehydrocyclodimerization, aromatization, transalkylation, isomerization, dehydrogenation, hydrogenation cracking, hydrocracking, reforming, cyclization, oligomerization, polymerization, dehydration and conversion of carbon monoxide/hydrogen mixtures to hydrocarbons.

Numerous methods have been developed for the preparation of catalysts and multifunctional catalysts (that is, a catalyst having more than one active metal serving more than one function).

Generally, such methods include the modification of a standard zeolitic catalyst support to protonic form through ion exchange procedures. At least one catalytically active metal is then impregnated or ion exchanged onto the acidic zeolite. This type of procedure, however, yields a poor spread of the active metal on the catalyst surface, thus yielding poor activity. Further, such ion exchange procedures are expensive. Finally, these procedures require the use of a support initially containing alkali and/or alkaline earth metals which further add to the cost involved.

It is thus the principal object of the present invention to provide a process for preparing an acidic catalyst which does not involve the use of ion exchange or impregnation procedures, and which does not require a starting support material containing alkali and/or alkaline earth metals and is, therefore, less expensive.

It is a further object of the present invention to provide a process for preparing a multifunctional catalyst which, as above, does not involve the use of ion exchange or impregnation procedures, and which does not require a starting support material containing alkali and/or alkaline earth metals and is, therefore, less expensive.

It is still another object of the present invention to provide such a process where the catalytically active metals have good surface dispersion and, therefore, good activity.

Other objects and advantages will appear hereinbelow.

SUMMARY OF THE INVENTION

The foregoing objects and advantages are readily obtained by the process of the present invention.

According to the invention, metallosilicate catalysts are prepared without using alkali or alkaline earth metals and without ion exchange or impregnation procedures.

The process of the present invention includes the steps of forming a mixture of an oxide, hydroxide or salt of at least one non-alkali metal, a templating agent, and an organic base; adding a silicon additive to said mixture so as to form a metallosilicate hydrogel; heating said hydrogel to obtain a crystalline metallosilicate composition; washing and drying said crystalline metallosilicate composition; and heating said crystalline metallosilicate composition to a temperature of at least about 500° C. at a rate of less than or equal to about 20° C. per minute so as to provide a metallosilicate catalyst.

According to a preferred embodiment of the invention, the forming step includes mixing an aqueous solution or a suspension of a salt, oxide or hydroxide of at least a first non-alkali metal and a second non-alkali metal different from the first non-alkali metal with an aqueous solution of templating agent and organic base and a silicon additive whereby the heating step yields a multifunctional catalyst.

According to a further preferred embodiment of the invention, the first and second non-alkali metal are selected from Groups IIB, IVB, VB, VIB, VIII and IIIA of the periodic table of elements. The second non-alkali metal should, of course, be different from the first. Further, the first non-alkali metal may preferably be chromium, iron, aluminum, gallium, boron, zinc or mixtures thereof, while the second and subsequent non-alkali metals may preferably be chromium, iron, aluminum, gallium, boron, titanium, zirconium, vanadium, zinc or mixtures thereof.

According to a still further preferred embodiment of the invention, halide compounds such as hydrogen fluoride or ammonium fluoride may be added to improve the characteristics of the so obtained catalyst.

BRIEF DESCRIPTION OF THE DRAWINGS

A detailed description of the preferred embodiments of the invention follows with reference to the attached drawings, wherein.

DETAILED DESCRIPTION

Figure 1:
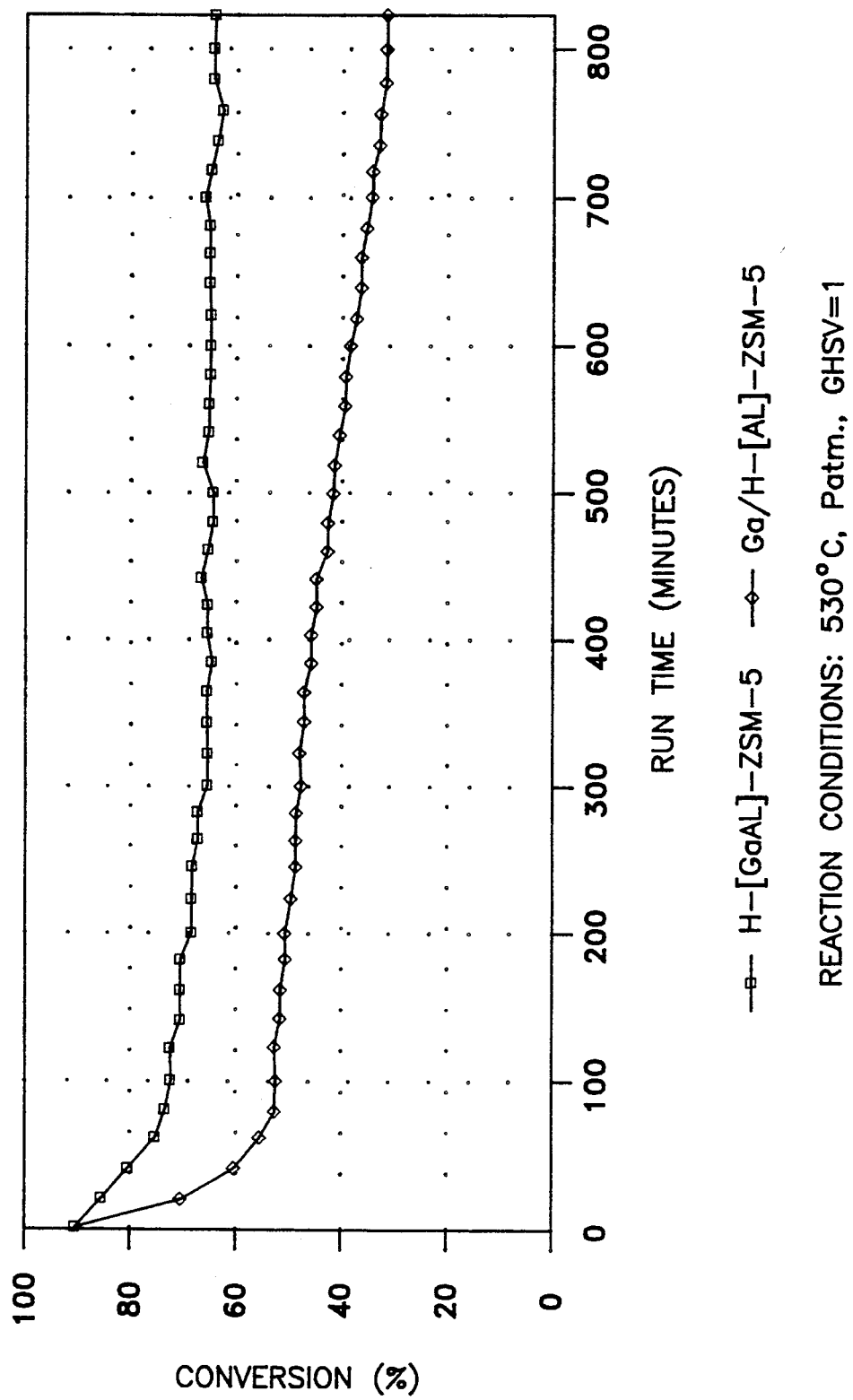
FIG. 1 is a graph comparing conversion rate and stability in aromatization of propane for an acidic multifunctional catalyst prepared according to the present invention to a conventionally prepared multifunctional catalyst.

The invention relates to a process for the preparation of a catalyst, especially a multifunctional catalyst, useful in numerous processes, but especially for use in hydrocarbon reactions such as alkylation, dealkylation, dehydrocyclodimerization, aromatization, transalkylation, isomerization, dehydrogenation, hydrogenation cracking, hydrocracking, reforming, cyclization, oligomerization, polymerization, dehydration and conversion of carbon monoxide/hydrogen mixtures to hydrocarbons.

The process according to the invention provides an acidic metallosilicate catalyst in a single step procedure, without the use of alkali or alkaline earth metals, and avoids ion exchange and impregnation of the crystalline catalyst, thus providing an efficient and effective catalyst at a greatly reduced cost. Further, catalysts prepared according to the present invention possess an improved surface dispersion of active metals and, therefore, improved performance.

The catalyst prepared according to the invention may preferably be a multifunctional catalyst, that is, a catalyst having two or more active metals providing two or more functions of the catalyst.

According to the invention, the metallosilicate catalyst is prepared by mixing at least one non-alkali metal with a templating agent and an organic base. The templating agent and organic base may be previously mixed. This mixture is preferably carried out by mixing water solutions or suspensions of one or more of the components as will be further described below.

A silicon additive is then added to the mixture, according to the invention, in order to form a metallosilicate hydrogel. The silicon additive may be any conveniently available silicon containing substance including, for example, silicon oxides, hydroxides and salts. Silicon additive is preferably added gradually under proper stirring, in order to obtain a substantially homogeneous mixture.

The hydrogel is then aged to form a crystalline metallosilicate composition. The crystalline metallosilicate composition is then washed, so as to remove soluble salts and organic base, until the filtrate shows a substantially neutral pH. The washed composition is then dried and heated to a temperature of at least about 500° C. so as to remove any remaining templating agent, thus yielding an acidic metallosilicate which is suitable for use as a catalyst. The heating step is carried out at a rate of less than or equal to about 20° C. per minute, and typically at about 5° C. per minute.

It should be noted that while the process of the present invention could of course be utilized in preparing numerous types of catalysts, the invention is directed especially to the synthesis of ZSM-5 and ZSM-11 type catalysts. The type of catalyst so obtained depends upon the templating agent selected as will be further described below.

Such an acidic metallosilicate is a useful catalyst composition as demonstrated in the examples below. Further, such an acidic metallosilicate may be prepared, according to the invention, with two or more active metals so as to provide a multifunctional catalyst. According to the prior art, such a multifunctional catalyst is conventionally prepared by first preparing an acidic metallosilicate support having alkali cations in the framework. These alkali cations are replaced with an active metal through conventional ion exchange procedures. The acidic catalyst so obtained is then conventionally impregnated with one or more additional active metals, followed by calcination to obtain the final multifunctional catalyst. It can be appreciated that the multiple steps and required materials for the conventional process contribute significantly to the cost of conventional preparation of such catalysts.

According to the present invention, however, conventional impregnation and ion exchange procedures are avoided by forming a mixture of all reactants including all active metals to be present in the catalyst, adding silicon additive to form a metallosilicate hydrogel, aging the hydrogel to obtain a crystalline metallosilicate composition, washing and drying the crystalline metallosilicate composition and heating the crystalline metallosilicate composition to a temperature of at least 500° C. at a rate of less than or equal to about 20° C. per minute, so as to remove the templating agent and. $NH_4$ and provide an acidic multifunctional catalyst.

The aging step serves to orient the crystals of the resulting metallosilicate composition to provide a framework structure which is critical, according to the invention, in providing the excellent results as set forth below in the Examples.

Suitable non-alkali metals include any metals other than alkali and alkaline earth metal, and are preferably selected from Groups IIB, IVB, VB, VIB, VIII and IIIA of the periodic table of elements. The first metal may preferably be chromium, iron, aluminum, gallium, boron, zinc or mixtures thereof.

The second metal may be any of the above, as well as titanium, zirconium, vanadium and mixtures thereof.

All metals to be used may preferably be supplied for the process in the form of an aqueous solution preferably made by dissolving a salt of the selected metal or metals in water. These metals could likewise be provided in the form of a suspension of the oxides or hydroxides of the desired metal(s) in water.

The templating agent may suitably be a quaternary alkyl ammonium or alkyl phosphonium salt or hydroxide, or mixtures thereof, as well as corresponding mono, bi and tri alkyl amines or phosphines. Preferable agents include tetrapropylammonium hydroxide or tetrapropylammonium bromide for the synthesis of ZSM-5 type catalysts, and butyl equivalents of these agents for the synthesis of ZSM-11 type catalysts.

The organic base serves to provide media having an alkaline pH without adding the commonly used alkali metal hydroxides. Suitable organic bases include organic amines, preferably alkyl amines such as $R.NH_2$, $(R)_2.NH$ or $(R)_3.N$, where R is an alkyl group, and may preferably be either a methyl group or an ethyl group.

The organic base provides a suitable pH in a crystalline structure which does not include alkali ions, and therefore is less costly to prepare. Thus, metallosilicates formed according to the invention can readily be transformed into catalyst form by simple calcination, without the previously required ion exchange and/or impregnation. Moreover, the process of the present invention results in excellent dispersion of the active metals and, therefore, improved catalytic activity.

According to an alternate embodiment of the invention, a halide compound may be added to the mixture of aqueous solutions or suspensions so as to influence the final size and/or shape of the crystals of the resulting crystalline structure. A suitable halide compound is, for example, a fluoride compound and may preferably be hydrogen fluoride or ammonium fluoride. Such a halide compound may be added in an amount sufficient to provide a molar ratio of F to Si of between about 0.4 to about 2.0.

The mixture of non-alkali metal, templating agent, organic base and silica is preferably carried out so as to provide molar ratios of oxides as follows:

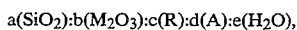

$$a(SiO_2):b(M_2O_3):c(R):d(A):e(H_2O),$$

wherein the silicon additive is $SiO_2$, M is a cation or a mixture of trivalent cations of non-alkali metal, R is the organic base, and A is the templating agent.

It has been found, according to the invention, that the above molar ratios are ideally provided so that a is between about 0.90 to about 0.95, b is between about 0.01 to about 0.06, c is between about 0.10 to about 20, d is between about 0.10 to about 5 and e is between about 20 to about 2,000. As regards the ratios of $SiO_2$ (a) and non-alkali metal (b), a is preferably between about 0.90 to about 0.92 and b is preferably between about 0.04 to about 0.06. Additionally, the combined molar ratio (a+b) has been found to ideally be about 0.96. Maintaining this combined molar ratio of $SiO_2$ and non-alkali metal at about 0.96 helps to provide the desired crystalline structure and improved characteristics of catalysts synthesized according to the present invention.

It should be noted that, if it was desired to provide a full silicium support, then a ratio of $SiO_2$ (a) of about 0.96 could be used with b being set to zero. The process of the present invention would, in this case, provide a full silicium support.

The mixture of the non-alkali metal/metals, templating agent and organic base may suitably be mixed at ambient temperature. As previously mentioned, the non-alkali metal/metals may suitably be added in the form of a salt aqueous solution, or as a suspension of oxides or hydroxides of the selected metal(s). The templating agent and organic base may also suitably be provided as aqueous solutions or suspensions.

The appropriate amount of silicon additive, determined according to the above ratios, is then slowly mixed in, preferably under stirring sufficient to provide a substantially homogeneous mixture, so as to form the desired metallosilicate hydrogel.

The hydrogel is then aged to obtain a crystalline metallosilicate composition. Such aging is preferably carried out at a temperature of between about 80° C. to about 225° C., for a period of time sufficient to provide the desired orientation and organization of the crystals of the composition. Such a time may suitably be at least about 12 hours, and preferably at least about 36 hours when aged under stirring or rocking conditions, which are believed to accelerate the aging process. Under static conditions, the aging time is preferably at least about 48 hours.

The time of the aging step is further dependent upon the temperature at which the hydrogel is aged. In any event, the aging is carried out so as to orient or structure the crystals of the metallosilicate.

It is also noted that the aging process may alternatively be broken into a first aging step wherein the hydrogel is aged at a temperature of up to about 60° C. for a period of time of between about 1 to 2 hours, followed by a second aging step wherein the hydrogel is aged at a temperature of between about 80° C. to about 225° C. for a period of time of at least about 12 hours as set forth above.

The aging process is preferably carried out in a closed vessel so as to prevent evaporation of elements of the hydrogel during aging, particularly at high temperatures.

Aging as set forth above yields an organized or oriented structured crystalline composition having an MFI or MEL-type structure (ZSM-5 or ZSM-11), depending as above upon the templating agent used.

The crystalline composition so obtained is then washed until the filtrate shows a substantially neutral pH, and then dried, according to well known procedures. Drying is preferably carried out at a temperature of between about 20° to 150° C.

The washed and dried crystalline composition is then heated gradually up to calcining temperature so as to remove any remaining $NH_4$ and templating agent, and finally to calcine the composition, thus yielding an acidic metallosilicate or multifunctional catalyst, depending upon the metals used in forming the starting mixture. This heating step is preferably carried out by gradually increasing the temperature of the composition, at a rate of less than or equal to about 20° C. per minute, and preferably at about 5° C. per minute. This heating is believed to remove $NH_4$ and templating agent, and to calcine the composition at a temperature of at least about 500° C., preferably between about 500° C. to about 800° C., and most preferably about 550° C. Such heating is preferably carried out in an oxidizing environment, such as air, to burn off coke.

The gradual heating is believed to provide a stepwise progression of the crystalline metallosilicate composition to the desired catalyst. The initial heating is believed to dewater the composition to the extent not completed in the drying step, or may itself serve as the drying step. After dewatering, as the temperature is further increased to exceed about 320° C., $NH_4$ and templating agent are removed. At about 500° C., the composition is calcined, to thereby yield the desired catalyst. The temperature, when it reaches at least about 500° C., may preferably be held at such calcining temperatures for a period of time of at least about 6 hours.

Catalysts prepared according to the process of the present invention are prepared in a single procedure which does not use any ion exchange or impregnation procedures as required by the prior art. Further, as such catalysts are prepared without alkali or alkaline earth metals, the process of the present invention significantly reduces the cost of preparing such catalysts. Further, and as demonstrated by the following examples, the catalysts prepared according to the present invention yield excellent results in the conversion of hydrocarbons as compared to conventionally prepared catalysts.

EXAMPLE 1

This example illustrates the preparation, according to the invention, of an acidic metallosilicate catalyst using gallium as the active metal to yield an MFI type gallosilicate catalyst.

Two aqueous solutions (A+B) were prepared as follows:

Solution A: 2.39 g of $Ga(NO_3)_3.9H_2O$ dissolved in 40 g of $H_2O$;

Solution B: 9.53 g of TPABr dissolved in 43 g of $H_2O$, previously mixed with 22.14 g of methylamine (40% aq. sol.).

Solution A was added to solution B under continuous stirring for 15 minutes at ambient temperature. Then 7.89 g of $SiO_2$ was slowly added under a rapid stirring. The resulting metallosilicate hydrogel was placed in a 75 ml Teflon coated stainless-steel autoclave, the autoclave being filled to ¾ capacity, and aged at 60° C. for 1½ hours. The hydrogel was then aged in the autoclave at 185° C. under static conditions for a period of 120 hours, yielding a crystalline MFI-type gallosilicate product, referred to as TPA-[Ga]-ZSM-5. The synthesized alkali free TPA-[Ga]-ZSM-5 was then washed to obtain a product free of residual soluble salts and organic base, until the filtrate showed a substantially neutral pH. The TPA-[Ga]-ZSM-5 was then dried, and heated to 550° C. under a dry air flow, and calcined at 550° C. for 6 hours in an oxidizing environment (air) to burn off coke and to provide H-[Ga]-ZSM-5 catalyst free of template, alkali cations and coke.

The resulting H-[Ga]-ZSM-5 catalyst was tested and found suitable as a catalyst for the hydrocarbon reactions involving moderate acidity such as alkylation, dealkylation, dehydrocyclodimerization, aromatization, transalkylation, isomerization, dehydrogenation, hydrogenation cracking, hydrocracking, reforming, cyclization, oligomerization, polymerization, dehydration and conversion of carbon monoxide/hydrogen mixtures to hydrocarbon.

EXAMPLE 2

This example illustrates the preparation of an acidic multifunctional catalyst using gallium and aluminum as the active metals.

Two aqueous solutions (A+B) were prepared as follows:
Solution A: 1.19 g of $Ga(NO_3)_3.9H_2O$ and 1.07 g of $Al(NO_3)_3.9H_2O$ were simultaneously dissolved in 40 g of $H_2O$;
Solution B: 9.53 g of TPABr were dissolved into 43 g of $H_2O$ which was previously mixed with 22.14 g of methylamine (40% aq. sol.).

Solution A was added to solution B under continuous stirring at room temperature for 15 minutes.

7.89 g of $SiO_2$ was then slowly added under rapid stirring. The resulting metallosilicate hydrogel was placed in a Teflon coated stainless-steel autoclave and aged at 60° C. for 1½ hours. The hydrogel was then aged in the autoclave at 185° C. under stirring (rocking) conditions for 12 hours until a crystalline MFI-type gallium aluminosilicate product was formed, referred to herein as TPA-[GaAl]-ZSM-5. The TPA-[GaAl]-ZSM-5 was washed to remove residual soluble salts and organic base until the filtrate showed a substantially neutral pH. The TPA-[GaAl]-ZSM-5 was then dried, heated from ambient temperature to 550° C. under a dry air flow, and calcined at 550° C. for 6 hours in an oxidizing environment (air) to burn off coke and, to provide H-[GaAl]-ZSM-5 catalyst free of template, alkali cations and coke. The H-[GaAl]-ZSM-5 catalyst was tested and found to be suitable as a multifunctional catalyst for the hydrocarbon reactions involving moderate acidity as described in Example 1.

EXAMPLE 3

This example demonstrates the synthesis of a multifunctional catalyst using chromium and aluminum, so as to prepare an MFI-type chromium aluminosilicate.

Two solutions (A+B) were prepared as follows:
Solution A: 1.142 g of $Cr(NO_3)_3.9H_2O$ and 1.07 g $Al(NO_3)_3.9H_2O$ were simultaneously dissolved to 40 g of $H_2O$;
Solution B: 9.53 g of TPABr were dissolved into 43 g of $H_2O$ which was previously mixed with 22.14 g of methylamine (40% aq. sol.).

Solution A was added to solution B under continuous stirring at room temperature for a period of 15 minutes.

7.89 g of $SiO_2$ was then slowly added under rapid stirring. The resulting metallosilicate hydrogel was placed in a Teflon coated stainless-steel autoclave up to ¾ capacity and aged at 60° C. for 1½ hours, and then at 185° C. under static conditions for 120 hours, until a crystalline MFI-type chromium aluminosilicate product was formed, this product being referred to as TPA-[CrAl]-ZSM-5. The TPA[CrAl]-ZSM-5 was then washed to remove residual soluble salts and organic base and to obtain a substantially neutral pH. The TPA-[CrAl]-ZSM-5 was then dried, heated from ambient temperature to a temperature of 550° C. under a dry air flow, and calcined at 550° C. for 6 hours in an oxidizing environment (air) to burn of coke and provide a multifunctional catalyst, H-[CrAl]-ZSM-5, which was found suitable for hydrocarbon reactions involving moderate acidity as in Example 1. The multifunctional catalyst so provided was free of template, alkali cations and coke.

EXAMPLE 4

In this example, the gallium aluminosilicate H-[GaAl]-ZSM-5 catalyst of Example 2 was compared to a conventionally prepared gallium aluminosilicate catalyst, referred to herein and in the drawings as Ga/H-[Al]-ZSM-5.

The conventionally prepared Ga/H-[Al]-ZSM-5 was prepared from a conventional sodium containing zeolite, Na-[Al]-ZSM-5, synthesized as follows. The Na-[Al]-ZSM-5 was calcined, to burn off the templating agent. An ion exchange step with an $NH_4^+$ containing solution was then performed to provide an $NH_4$[Al]-ZSM-5. Further calcination yielded HA-[AL]-ZSM-5, in acidic or protonic form. This catalyst was then impregnated with a $Ga^{3+}$ containing solution to provide Ga/H-[Al]-ZSM-5. Both catalysts were prepared so as to contain the same amounts of Ga, Al and Si.

Both catalysts were analyzed with FAAS, Flame Atomic Absorption Spectroscopy, and also with NMR techniques.

Table 1 below sets for the Ga and Si content of each catalyst as determined by FAAS.

TABLE 1

| CHEMICAL COMPOSITION OF SAMPLES: (using FAAS technique) | | |
|---|---|---|
| | Total Content | |
| | Ga(%) | Si(%) |
| Ga/H-[Al]-ZSM-5 | 1.35 ± 0.02 | 35.2 ± 0.1 |
| H-[GaAl]-ZSM-5 | 1.42 ± 0.02 | 34.8 ± 0.1 |

The results of NMR testing show that Ga is in the framework of the composition.

Figure 2:
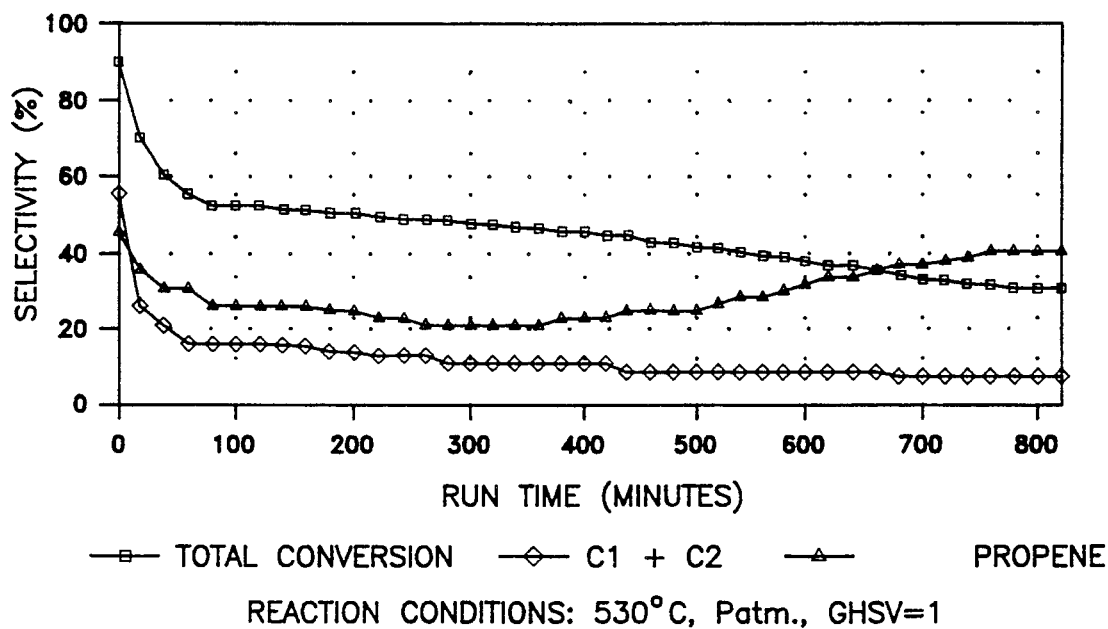
FIGS. 2 and 3 are graphs showing selectivity of the conventionally prepared multifunctional catalyst of FIG. 1 in the aromatization of propane.
Figure 3:
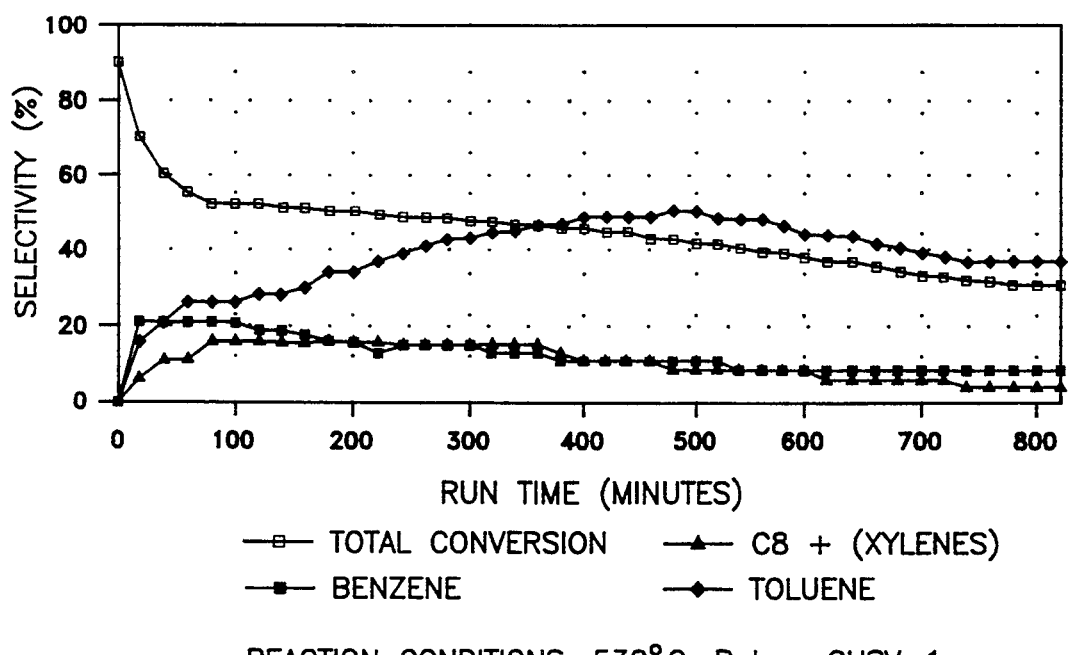
Figure 4:
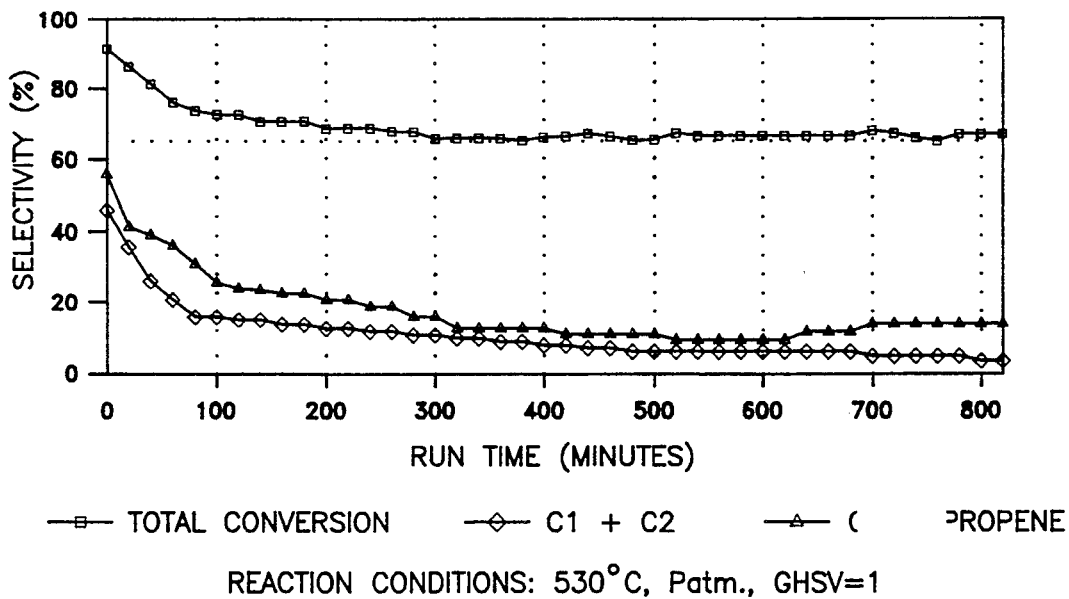
FIGS. 4 and 5 are graphs showing selectivity of the acidic multifunctional catalyst of FIG. 1 which was prepared according to the present invention in the aromatization of propane.
Figure 5:
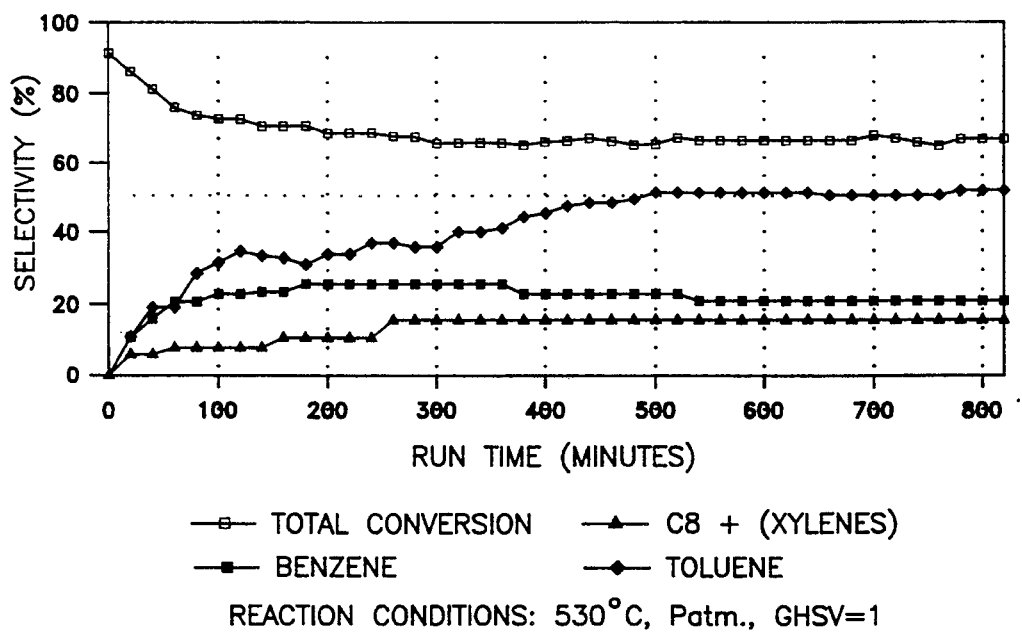

Both catalysts were used as catalytic precursors for the aromatization of propane at 530° C., GHSV=1, and atmospheric pressure. FIG. 1 illustrates the total conversion rate for each catalyst. As illustrated, the gallium aluminosilicate prepared according to the present invention exhibited a markedly improved stability over the conventionally prepared catalyst. The selectivity of each catalyst was also observed during the process illustrated in FIG. 1. FIGS. 2 and 3 illustrate the selectivity of the prior art gallium aluminosilicate while FIGS. 3 and 4 illustrate the selectivity of gallium aluminosilicate prepared according to the present invention. It is believed that the improved conversion characteristics exhibited by the catalyst prepared according to the present invention are due at least in part to an improved dispersion of the active metal over the catalyst.

EXAMPLE 5

This example demonstrates the synthesis of an MFI type borosilicate catalyst.

Two solutions (A+B) were prepared as follows:
Solution A: 3.1 g of $H_3BO_3$ was dissolved into 90 g of $H_2O$ and mixed with 8.8 ml of a 40% aqueous solution of HF;
Solution B: 66.5 g of TPABr were dissolved into 180 g of $H_2O$ which was previously mixed with 344 ml of methylamine (40% aq. sol.).

Solution A was added to solution B under continuous stirring at room temperature for a period of 15 minutes.

30 g of SiO$_2$ (57.5 ml of LUDOX 40) was then slowly added under rapid stirring. The resulting metallosilicate hydrogel was then placed in a 600 ml Teflon coated stainless-steel autoclave up to ¾ capacity and aged at 60° C. for 1½ hours, and then at 185° C. under static conditions for 120 hours until a crystalline MFI-type borosilicate product was formed, this product being referred to as TPA-[B]-ZSM-5. The TPA-[B]-ZSM-5 was then washed to remove residual soluble salts and organic base until the filtrate showed a substantially neutral pH. The TPA-[B]-ZSM-5 was then dried, heated from ambient temperature to a temperature of 550° C. under a dry air flow, and calcined at 550° C. for 6 hours in an oxidizing environment (air) to burn off coke and to provide a catalyst, H-[B]-ZSM-5, which was found suitable for hydrocarbon reactions involving moderate acidity as in Example 1. The catalyst so provided was free of template, alkali cations and coke.

EXAMPLE 6

This example demonstrates the synthesis of an MFI-type zinc silicate catalyst.

Two solutions (A+B) were prepared as follows:
Solution A: 5.23 g of Zn(NO$_3$)$_2$ was dissolved into 282 g of H$_2$O;
Solution B: 66.67 g of TPABr were dissolved into 300 g of H$_2$O which was previously mixed with 155 g of methylamine (40% aq. sol.).

Solution A was added to solution B under continuous stirring at room temperature for a period of 15 minutes.

56.4 g of SiO$_2$ was then slowly added under rapid stirring. The resulting metallosilicate hydrogel was placed in a 1500 ml Teflon coated stainless-steel autoclave up to ¾ capacity and aged at 185° C. under rotation for 120 hours until a crystalline MFI-type zinc silicate product was formed, this product being referred to as TPA-[Zn]-ZSM-5. The TPA-[Zn]-ZSM-5 was then washed to remove residual soluble salts and organic base until the filtrate showed a substantially neutral pH. The TPA-[Zn]-ZSM-5 was then dried, heated from ambient temperature to a temperature of 550° C. under a dry air flow, and calcined at 550° C. for 6 hours in an oxidizing environment (air) to burn off coke and provide a catalyst, H-[Zn]-ZSM-5, which was found suitable for hydrocarbon reactions involving moderate acidity as in Example 1. The catalyst so provided was free of template, alkali cations and coke.

EXAMPLE 7

This example illustrates the syntheses of an MFI-type Galloaluminochromosilicate. This catalyst was prepared through the reaction of the following solutions in a laboratory autoclave.
Solution A: 3.22 g of Cr(NO$_3$)$_3$.9H$_2$O dissolved in 120 g of H$_2$O;
Solution B: 6.04 g of Al(NO$_3$)$_3$.9H$_2$O and 2.05 g of Ga(NO$_3$)$_3$.9H$_2$O dissolved in 150 g of H$_2$O.
Solution C: 53.64 g of TPABr dissolved in 308,1 g of H$_2$O, previously mixed with 62.35 g of methylamine (40% v/v).

These solutions were mixed together as follows: Solution A was added to solution C while stirring for 15 minutes at room temperature, then solution B was added to this mixture, prior to the final slow addition of the required amount of SiO$_2$ (44.60 g) under rapid stirring. The resulting mixture was placed in a 1 liter Teflon coated autoclave up to ¾ capacity and aged at 60° C. for 1½ hours. The gel was then aged at 185° C., under stirring conditions (twisting) and held for 120 hours until the crystalline MFI-type galloaluminochromosilicate product was formed.

The synthesized Na-free TPA-[GaAlCr]-ZSM-5 was then washed free of soluble salts and organic base until the filtrate showed a neutral pH, dried and then calcined at 550° C., under air flow, during at least 6 hours. The resulting Cr$_x$/H-[GaAlCr$_y$]-ZSM-5 (wherein x+y=100% of added Cr) is a suitable bifunctional acidic catalyst for hydrocarbon reactions involving moderate acidity, substantially the same as indicated in Example 1.

When the calcination step is conducted under an oxidative atmosphere, the procedure provides, among other advantages, a higher dispersion of the "metallic" active phase, in this case part of the framework Cr$^{3+}$, expelled from the lattice (referred to as Cr$_x$) at the outer surface of the zeolite.

This invention may be embodied in other forms or carried out in other ways without departing from the spirit or essential characteristics thereof. The present embodiments are therefore to be considered as in all respects to be illustrative and not restrictive, the scope of the invention being indicated by the appended claims, and all changes which come within the meaning and range of equivalency are intended to be embraced therein.

What is claimed is:

1. A process for preparing an acidic metallosilicate catalyst, comprising the steps of:
    forming a mixture of at least one non-alkali metal, a templating agent, and an organic base;
    adding a silicon additive to said mixture so as to form a metallosilicate hydrogel;
    aging said hydrogel to obtain a crystalline metallosilicate composition;
    washing and drying said crystalline metallosilicate composition; and
    heating said crystalline metallosilicate composition to a temperature of at least about 500° C. at a rate of less than or equal to about 20° C. per minute so as to provide said acidic metallosilicate catalyst.

2. A process according to claim 1, wherein said forming step includes the step of forming a mixture of at least a first non-alkali metal and a second non-alkali metal different from said first non-alkali metal, a templating agent, and an organic base, whereby said heating step yields an acidic multifunctional catalyst.

3. A process according to claim 2, wherein said first non-alkali metal is selected from the group consisting of elements of Groups IIB, IVB, VB, VIB, VIII and IIIA of the periodic table of elements.

4. A process according to claim 3, wherein said first non-alkali metal is selected from the group consisting of chromium, iron, aluminum, gallium, boron, zinc, and mixtures thereof.

5. A process according to claim 2, wherein said second non-alkali metal is selected from the group consisting of elements of Groups IIB, IVB, VB, VIB, VIII and IIIA of the periodic table of elements.

6. A process according to claim 2, wherein said second non-alkali metal is selected from the group consisting of chromium, iron, aluminum, gallium, boron, titanium, zirconium, vanadium, zinc and mixtures thereof.

7. A process according to claim 2, wherein said templating agent is selected from the group consisting of quaternary alkyl ammonium salts, quaternary alkyl ammonium hydroxides, quaternary alkyl phosphonium salts, quaternary alkyl phosphonium hydroxides, alkyl amines, alkyl phosphenes, and mixtures thereof.

8. A process according to claim 7, wherein said templating agent is tetrapropylammonium hydroxide.

9. A process according to claim 7, wherein said templating agent is tetrapropylammonium bromide.

10. A process according to claim 2, wherein said organic base is an alkyl amine.

11. A process according to claim 10, wherein said organic base is an alkyl amine having alkyl groups selected from the group consisting of methyl and ethyl.

12. A process according to claim 1, wherein said aging step includes heating said hydrogel to a temperature of between about 80° C. to about 225° C. for a period of time sufficient to provide said crystalline metallosilicate composition.

13. A process according to claim 12, wherein said aging step is carried out under static conditions for a period of time of at least about 48 hours.

14. A process according to claim 12, wherein said aging step is carried out under stirring conditions for a period of time of at least about 12 hours.

15. A process according to claim 1, wherein said aging step includes a first aging step wherein said hydrogel is heated to a temperature of up to about 60° C. for a period of time of between about 1 hour to about 2 hours, and a second aging step wherein said hydrogel is heated to a temperature of between about 80° C. to about 225° C. for a period of time sufficient to provide said crystalline metallosilicate structure.

16. A process according to claim 1, wherein said heating step includes heating said crystalline metallosilicate compositions to a temperature of between about 500° C. to 800° C.

17. A process according to claim 1, wherein said heating step includes heating said crystalline metallosilicate composition to a temperature of about 550° C.

18. A process according to claim 1, wherein said heating step removes said templating agent and NH$_4$ and calcines said crystalline metallosilicate composition so as to provide said acidic metallosilicate catalyst.

19. A process according to claim 2, wherein said at least first and second non-alkali metal, said templating agent, said organic base and said silicon additive are mixed so as to form a composition having molar ratios of oxides as follows:

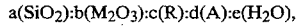

wherein SiO$_2$ is said silicon additive, M is a mixture of trivalent cations of said at least first and second non-alkali metals, R is said organic base, A is said templating agent, a is between about 0.90 to about 0.95, b is between about 0.01 to about 0.06, c is between about 0.10 to about 20, d is between about 0.10 to about 5, and e is between about 20 to about 2000.

20. A process according to claim 19, wherein a+b is about 0.96.

21. A process according to claim 19, wherein a is between about 0.90 to about 0.92 and b is between about 0.04 to about 0.06.

22. A process according to claim 21, wherein a+b is about 0.96.

23. A process according to claim 2, further comprising the step of adding a halide compound to said mixture so as to influence crystal size and orientation of said multifunctional catalyst.

24. A process according to claim 23, wherein said halide compound is a fluoride compound.

25. A process according to claim 24, wherein said fluoride compound is selected from the group consisting of hydrogen fluoride and ammonium fluoride.

26. A process according to claim 1, wherein the forming step includes forming a mixture of an aqueous solution of a salt of at least one non-alkali metal, an aqueous solution of a templating agent, and an organic base.

27. A process according to claim 1, wherein said silicon additive is selected from the group consisting of silicon oxides, silicon hydroxides, and silicon salts.

28. A process according to claim 1, wherein said washing step is carried out until a filtrate from said washing step shows a substantially neutral pH.

29. A process for preparing a catalyst, comprising the steps of:
forming a mixture of at least one non-alkali metal, a templating agent, and an organic base;
adding a silicon additive to said mixture so as to form a hydrogel, said at least one non-alkali metal, said templating agent, said organic base and said silicon additive being mixed so as to form a composition having molar ratios of oxides as follows:

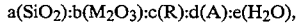

wherein SiO$_2$ is said silicon additive, M is a mixture of trivalent cations of said at least one non-alkali metal, R is said organic base, A is said templating agent, a is between about 0.90 to about 0.96, b is between 0 to about 0.06, c is between about 0.10 to about 20, d is between about 0.10 to about 5, e is between about 20 to about 2000, and a+b is about 0.96;
aging said hydrogel to obtain a crystalline composition;
washing and drying said crystalline composition; and
heating said crystalline composition to a temperature of at least about 500° C. at a rate of less than or equal to about 20° C. per minute so as to provide said catalyst.

30. A process according to claim 1, wherein said heating step is carried out at a rate of less than or equal to about 5° C. per minute.

* * * * *